(12) United States Patent
Kim et al.

(10) Patent No.: US 9,825,301 B2
(45) Date of Patent: Nov. 21, 2017

(54) ELECTRODE WITH IMPROVEMENT OF BIASED MOVEMENT AND SECONDARY BATTERY COMPRISING THE SAME

(71) Applicant: LG Chem, Ltd., Seoul (KR)

(72) Inventors: Young-Soo Kim, Daejeon (KR); Kwan-Soo Lee, Daejeon (KR); Duk-Hyun Ryu, Daejeon (KR)

(73) Assignee: LG Chem, Ltd. (KR)

( * ) Notice: Subject to any disclaimer, the term of this patent is extended or adjusted under 35 U.S.C. 154(b) by 213 days.

(21) Appl. No.: 14/440,556

(22) PCT Filed: Sep. 30, 2014

(86) PCT No.: PCT/KR2014/009230
§ 371 (c)(1),
(2) Date: May 4, 2015

(87) PCT Pub. No.: WO2015/047047
PCT Pub. Date: Apr. 2, 2015

(65) Prior Publication Data
US 2015/0303485 A1 Oct. 22, 2015

(30) Foreign Application Priority Data

Sep. 30, 2013 (KR) .................. 10-2013-0116939
Sep. 30, 2014 (KR) .................. 10-2014-0131877

(51) Int. Cl.
| H01M 4/66 | (2006.01) |
| H01M 10/04 | (2006.01) |
| H01M 10/052 | (2010.01) |
| H01M 4/04 | (2006.01) |
| H01M 4/64 | (2006.01) |
| H01M 2/02 | (2006.01) |

(52) U.S. Cl.
CPC ......... *H01M 4/668* (2013.01); *H01M 2/0237* (2013.01); *H01M 4/0404* (2013.01); *H01M 4/64* (2013.01); *H01M 4/661* (2013.01); *H01M 10/0431* (2013.01); *H01M 10/052* (2013.01); *H01M 2220/20* (2013.01); *Y02E 60/122* (2013.01)

(58) Field of Classification Search
CPC ........ H01M 4/668; H01M 4/64; H01M 4/661; H01M 10/0431; H01M 10/052; H01M 4/0404; H01M 2/0237; H01M 2220/20; Y02E 60/122
See application file for complete search history.

(56) References Cited

U.S. PATENT DOCUMENTS

2006/0008702 A1* 1/2006 Cheon ............... H01M 2/16
429/164
2011/0287302 A1 11/2011 Kim
2014/0079992 A1 3/2014 Tanaka

FOREIGN PATENT DOCUMENTS

| CN | 102255100 A | 11/2011 |
| JP | H10162859 A | 6/1998 |
| JP | 2002100364 A | 4/2002 |
| JP | 2012248282 A | 12/2012 |
| JP | 2013152870 A | 8/2013 |
| KR | 20040058918 A | 7/2004 |
| KR | 20060134351 A | 12/2006 |
| WO | 2012164642 A1 | 12/2012 |

OTHER PUBLICATIONS

International Search Report for Application No. PCT/KR2014/009230 dated Jan. 28, 2015.

* cited by examiner

*Primary Examiner* — Muhammad S Siddiquee
(74) *Attorney, Agent, or Firm* — Lerner, David, Littenberg, Krumholz & Mentlik, LLP

(57) ABSTRACT

The present disclosure refers to a secondary battery comprising a reinforcing material in the fore part of an electrode current collector used in a jelly-roll type electrode assembly, thereby making the jelly-roll type electrode assembly wound in the predetermined position and eventually solving the problem an internal short-circuit due to biased movement.

10 Claims, 2 Drawing Sheets

ELECTRODE WITH IMPROVEMENT OF BIASED MOVEMENT AND SECONDARY BATTERY COMPRISING THE SAME

CROSS REFERENCE TO RELATED APPLICATIONS

The present application is a national phase entry under 35 U.S.C. §371 of International Application No. PCT/KR2014/009230, filed Sep. 30, 2014, which claims priority from Korean Patent Application No. 10-2013-0116939 filed on Sep. 30, 2013 and Korean Patent Application No. 10-2014-0131877 filed on Sep. 30, 2014, all of which are hereby incorporated herein by reference.

TECHNICAL FIELD

The present disclosure relates to an electrode with improvement in biased movement and a secondary battery comprising the electrode.

BACKGROUND ART

Recently, chargeable/rechargeable secondary batteries have been widely used as an energy source for wireless mobile devices. Also, the secondary battery has attracted considerable attention as a power source for electric vehicles (EVs), hybrid electric vehicles (HEVs), and plug-in hybrid electric vehicles (plug-in HEVs) which have been developed to solve problems, such as air pollution, caused by existing gasoline and diesel vehicles using fossil fuel. Such secondary batteries have been prepared in the form that an electrode assembly and an electrolyte solution are put in a battery case.

Electrode assemblies are classified into a stack type, a folding type, a stack-folding type, and a jelly-roll type. The stack or stack-folding type electrode assemblies have a structure obtained by interposing separators between multiple cathode units and multiple anode units, followed by sequentially laminating.

Meanwhile, the jelly-roll type electrode assemblies have a structure obtained by interposing a separator between a sheet type cathode having an active material applied on a current collector and a sheet type anode having an active material applied on a current collector, followed by winding, the cathode and the anode being prepared in advance. The unit electrode such as a cathode or an anode is prepared through the processes such as notching an electrode current collector at an interval of the unit electrode, applying an electrode slurry, applying a coating agent and so on. In such an overall processes for preparing of a battery, a sheet of an electrode is repeatedly subject to (re)winding. As used herein, the term 'sheet' is the generic term indicating both of current collectors having an active material applied thereon, and current collectors having no active material applied thereon. In this case, the part of an electrode to be first fed to (re)winding rolls is a fore part of a current collector. Referring to FIG. 1, the fore part of a current collector corresponds to an uncoated region 2a where an electrode active material layer is not formed thereon and more specifically the width direction end (W) of the uncoated region first begins to be fed to (re)winding rolls. Especially, a cathode current collector 2 is generally made of an aluminum foil, which may cause curling of the fore part during (re)winding due to its low tension of the current collector. When the fore part of an electrode is subject to curling, the biased movement of the electrode occurs and the electrode assembly fails to be laminated in the predetermined position, which may cause contact of the uncoated region of a cathode with an anode active material, contact of the uncoated region of an anode with a cathode active material or contact of the uncoated region of the cathode with the uncoated region of the anode, thereby causing an internal short-circuit.

DISCLOSURE

Technical Problem

The present disclosure is designed to solve the above-mentioned problems, i.e., biased movement of an electrode, which occurs due to curling of the fore part of an electrode current collector and results in an internal-short circuit in a battery.

Technical Solution

In accordance with one aspect of the present disclosure, there is provided an electrode, comprising an electrode current collector and an active material layer formed on at least one surface of the electrode current collector, wherein a reinforcing material for enhancing tension is applied to the fore part of the electrode current collector.

The reinforcing material may be applied to the width-direction end of the fore part of the electrode current collector.

The reinforcing material may be applied to both the longitudinal direction end of the fore part of the electrode current collector.

The reinforcing material may be applied at the width-direction end of the fore part of the electrode current collector and at both the longitudinal direction end thereof.

The reinforcing material may be applied extending from the fore part of the electrode current collector to the starting part of the active material layer.

The reinforcing material may be applied on both surfaces of the fore part of the electrode current collector.

The reinforcing material may have a thickness of 10 to 100 μm.

The reinforcing material may be thinner than the active material layer.

The reinforcing material may be made of any one selected from the group consisting of polytetrafluoroethylene (PTFE), tetrafluoroethylene-hexafluoropropylene copolymer (FEP), tetrafluoroethylene-ethylene copolymer (ETFE), tetrafluoroethylene-perfluoroalkylvinylether copolymer (PFA), polyvinylidene fluoride (PVDF), polybutylene terephthalate (PBT), polyethylene terephthalate (PET), polyethylene (PE), polyvinyl chloride (PVC), acetate resins, polyimide, glass cloth tapes, polyester, polyphenylene sulfide (PPS), polypropylene resins, steel use stainless, and a mixture thereof.

The electrode current collector may be made of aluminum.

The fore part of the electrode current collector may be surrounded with one (1) sheet of the reinforcing material at the width-direction end, the longitudinal direction end, or all of them.

In accordance with another aspect of the present disclosure, there is provided a jelly-roll type electrode assembly, comprising the above-mentioned electrode.

In accordance with still another aspect of the present disclosure, there is provided a secondary battery, comprising the jelly-roll type electrode assembly being sealed within a battery case.

In accordance with yet still another aspect of the present disclosure, there is provided a battery pack, comprising two or more unit cells, wherein each unit cell is the secondary battery.

The battery pack may be used as a power supply for electric vehicles, hybrid electric vehicles, plug-in hybrid electric vehicles or power storage devices.

In accordance with yet still another aspect of the present disclosure, there is provided a method for preparing a secondary battery comprising a jelly-roll type electrode assembly consisting of a cathode, a separator and an anode, comprising applying a reinforcing material over a segment to be formed as the width-direction end of the fore part of an electrode current collector and the width-direction end of the rear part of another electrode current collector in a continuous electrode current collector sheet; and cutting the continuous electrode current collector sheet at intervals of unit electrodes so that the reinforcing material is applied to the width-direction end of the fore part of one electrode current collector and at the width-direction end of the rear part of another electrode current collector.

Advantageous Effects

According to the present disclosure, an electrode can be wound in the predetermined position without the curling of the sheet of the electrode in the preparation of a jelly-roll type electrode assembly, thereby preventing the biased movement of the electrode sheet and an internal-short circuit.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the constitution of the embodiments and drawings presented herein is just a preferable example for the purpose of illustrations only, not intended to limit the scope of the disclosure, so it should be understood that other equivalents and modifications could be made thereto without departing from the spirit and scope of the disclosure.

Figure 1:
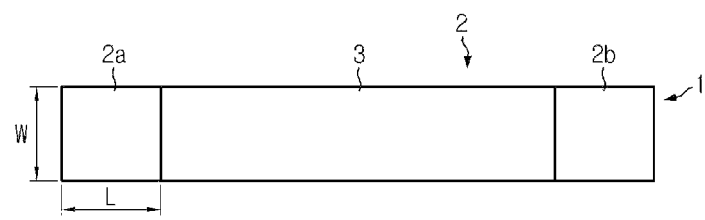
FIG. 1 schematically shows a conventional electrode before winding.

FIG. 1 schematically shows a conventional electrode before winding, and each of FIGS. 2 to 5 shows an electrode according to one embodiment of the present disclosure before winding.

Referring to FIGS. 1 to 5, an active material layer 3 is formed in the center of a current collector 2. Also, a region where an active material is not formed is at both side of the active material layer 3 (see FIGS. 1 to 5). As used herein, a term 'uncoated region' refers to the region where an active material is not formed on an electrode current collector.

The current collector 2 usable in the present disclosure may be any one which is conventionally used in the art, i.e., any one made of conventional materials known in the art and, if necessary, being processed by a conventional method known in the art. For example, a porous current collector may be used. The effect of the present disclosure can be more remarkable when the prevention of curling of a current collector is especially required due to the nature of a raw material and/or the thickness of the current collector. For this reason, the present disclosure can be preferably applied to an electrode wherein a current collector made of aluminum is used.

The active material layer 3 may be formed by coating a slurry containing an active material, a conductive material and a binder, each of which may be ones usually used in the art, followed by drying. The components composing the active material and the composition thereof are not limited in the present disclosure.

Referring to FIG. 1, a conventional electrode 5 comprises no material or no means for reinforcing the tension of a current collector 2. Accordingly, when the electrode manufactured using a current collector made of a low tension material such as aluminum is fed to a winding device, the fore part of the electrode current collector 2 becomes curled. As used herein, the term "fore part" refers to the segment where the (re)winding of an electrode starts when the the electrode is fed in the core direction, for example the '2a' part in FIG. 1.

The present disclosure is characterized by applying a reinforcing material for enhancing tension to the predetermined position of the fore part of the electrode, thereby solving the problem that the fore part of the electrode is curled and biased movement of the electrode is generated therefrom.

As used herein, the term "reinforcing material" refers to any component that may be applied to the predetermined position of an electrode, thereby inhibiting or preventing the curling of the sheet of the electrode.

As used herein, the term "predetermined position of an electrode" refers to any position of the electrode where the reinforcing material is applied to solving the curling phenomenon of the fore part of the electrode and the biased movement generated therefrom.

Figure 2:
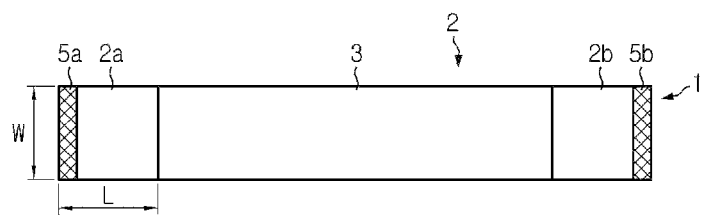
FIG. 2 schematically shows an electrode according to one embodiment of the present disclosure before winding.
Figure 5:
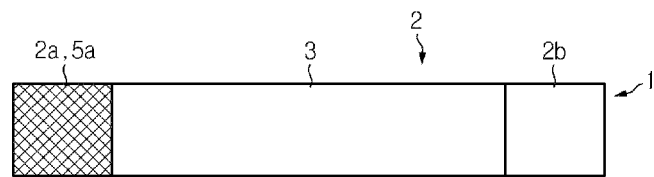
FIG. 5 schematically shows an electrode according to another embodiment of the present disclosure before winding.

For example, referring to FIG. 2 showing one embodiment of the present disclosure, a reinforcing material 5a may be attached at the width-direction end (W) of the fore part 2a of the electrode current collector 2. When the reinforcing material 5a is applied to the fore part 2a of the electrode current collector 2, the width of the reinforcing material 5a may be determined so that the working effect of an electrode active material is not adversely affected. As shown in FIG. 5, the the reinforcing material 5a may have a width extending to the starting part of an active material layer 5 or have a width which extends so that the reinforcing material 5a is partially overlapped with the active material layer 5.

Figure 3:
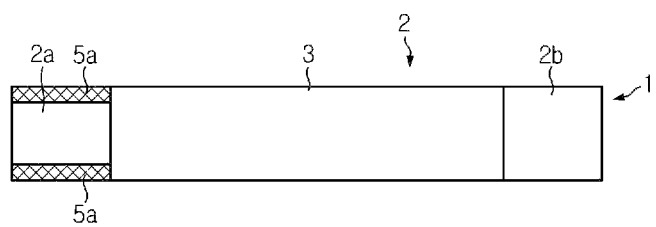
FIG. 3 schematically shows an electrode according to another embodiment of the present disclosure before winding.
Figure 4:
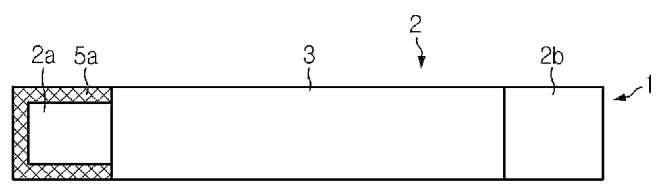
FIG. 4 schematically shows an electrode according to another embodiment of the present disclosure before winding.

Also, according to another embodiments of the present disclosure, the reinforcing material 5a may be applied to the longitudinal direction end (L) of the fore part 2a of the electrode current collector 2 (FIG. 3) or may be applied to the longitudinal direction end (L) and the width direction end (W) of the fore part 2a of the electrode current collector 2 (FIG. 4).

As mentioned above, the reinforcing material 5a applied to the fore part of the electrode current collector 2 can enhance the tension of the electrode current collector 2. As a result, the electrode 1 can be fed to a winding device to be wound without any curling. The reinforcing material 5a should provide a sufficient tension reinforcement so that the fore part 2a of the electrode current collector 2 is not easily curled and at the same time should not form a significant height difference in a current collector.

The reinforcing material may have a thickness of 10 to 100 μm. It is particularly preferred that the reinforcing material has a thickness equivalent to or thinner than that of the active material layer.

The reinforcing material usable in the present disclosure is not limited if it is a material capable of enhancing the tension of a current collector and having high stability to an electrolyte solution or lithium ions, high insulating property and good thermal stability.

Non-limiting examples of the reinforcing material may include polytetrafluoroethylene (PTFE), tetrafluoroethylene-hexafluoropropylene copolymer (FEP), tetrafluoroethylene-ethylene copolymer (ETFE), tetrafluoroethylene-perfluoroalkylvinylether copolymer (PFA), fluororesin such as polyvinylidene fluoride (PVDF), polybutylene terephthalate (PBT), polyethylene terephthalate (PET), polyethylene (PE), polyvinyl chloride (PVC), acetate resins, polyimide, glass cloth tapes, polyester, polyphenylene sulfide (PPS), polypropylene resins, and a mixture thereof, which may be applied in the form of an insulating tape to the predetermined position of an electrode current collector. Alternatively, the reinforcing material may be a metal such as steel use stainless (SUS) that can more strengthen the tension, and it may be applied in the form of a film to the predetermined position of the electrode current collector.

The reinforcing material may be attached to the electrode current collector by an adhesive applied on one surface of the reinforcing material. In some cases, the reinforcing material may be attached to the electrode current collector by way of thermal bonding.

The reinforcing material may be present only at the fore part of the electrode current collector 2, or in some cases, it may be present in the rear part of the electrode current collector 2 as well as the fore part. For example, the reinforcing material may be applied over a segment to be formed as the width-direction end of the fore part of an electrode current collector and the width-direction end of the rear part of another electrode current collector in a continuous electrode current collector sheet; and the continuous electrode current collector sheet is cut at a interval of unit electrodes so that the reinforcing material is applied at the width-direction end of the fore part of one electrode current collector and at the width-direction end of the rear part of another electrode current collector.

An embodiment is shown in FIG. 2. Referring to FIG. 2, there are reinforcing materials 5a and 5b in the fore part and the rear part, respectively, of the electrode current assembly.

Referring to FIG. 5 showing another embodiment of the present disclosure, the reinforcing material 5a is applied extending from the fore part of a cathode to the interface between the uncoated region and the active material layer of the cathode, thereby providing electrical insulating property and improving safety. In this case, the reinforcing material may extend to cover the interface between the electrode current collector 2 and the active material layer 3, thereby eliminating the necessity of attaching an insulating tape to the interface between the electrode current collector and the active material layer. It is preferred that the extended length of the reinforcing material is determined so that the working effect of the active material layer is not adversely affected.

Figure 6:
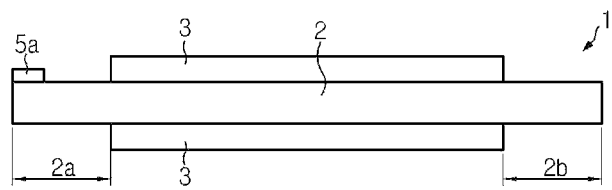
FIG. 6 laterally shows an example of the electrode shown in FIG. 2 wherein one sheet of reinforcing material is applied on one surface of the fore part of an electrode current collector.
Figure 7:
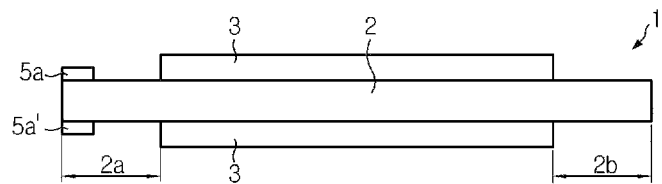
FIG. 7 laterally shows an example of the electrode shown in FIG. 2 wherein two sheets of reinforcing material are applied on each of both surfaces of an electrode current collector.
Figure 8:
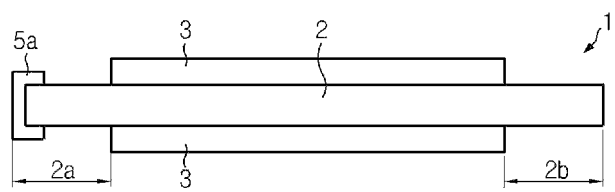
FIG. 8 laterally shows an example of the electrode shown in FIG. 2 wherein one sheet of reinforcing material is applied on both surfaces of an electrode current collector.

Also, according to one embodiment of the present disclosure, one sheet of the reinforcing material 5a may be applied on one surface of the fore part (FIG. 6), and the reinforcing material also may be applied on both surfaces thereof. In this case, two sheets of the reinforcing material 5a, 5a' may be formed on both surfaces of the electrode current collector by way of lamination adhesion (FIG. 7) or one sheet of the reinforcing material 5a may be applied to surround the fore part of both surfaces of the electrode current collector (FIG. 8). That is, the fore part of the electrode current collector may be surrounded with one sheet of the reinforcing material at the width-direction end, at the longitudinal direction end, or at all of them. When the fore part of the electrode current collector is surrounded with one sheet of the reinforcing material, it is favorable in that the delamination between the reinforcing material and the electrode current collector does not occur.

Thus, the reinforcing material can be applied according to embodiments shown in FIGS. 3 to 5 as well as FIG. 2.

In addition, the present disclosure provides a secondary battery, comprising the above electrode assembly, together with an electrolyte solution, sealed within a battery case.

The secondary battery is preferably a lithium secondary battery having high energy density, good discharge voltage and output stability. The secondary battery of the present disclosure comprises the following components.

The lithium secondary battery generally consists of a cathode, an anode, a separator, and a non-aqueous electrolyte solution containing a lithium salt.

The cathode is prepared, for example, by applying a mixture of a cathode active material, a conductive material and a binder on a cathode current collector, followed by drying. If necessary, the cathode may further comprise a filler. The anode is prepared by applying an anode material on an anode current collector, followed by drying. If necessary, the anode may further comprise other components as described above.

The separator is interposed between the cathode and the anode, and a thin insulating film having high ionic permeability and excellent mechanical strength may be used as the separator.

The non-aqueous electrolyte solution containing a lithium salt comprises a non-aqueous electrolyte and a lithium salt. The non-aqueous electrolyte may be a non-aqueous liquid electrolyte, a solid electrolyte, an inorganic solid electrolyte and so on.

The current collector, the electrode active material, the conductive material, the binder, the filler, the separator, the electrolyte solution, and the lithium salt are known in the art, so their specific explanation is omitted in the present disclosure.

The secondary battery of the present disclosure may be prepared by a conventional method known in the art, for example, by interposing a separator between a cathode and an anode and introducing an electrolyte solution therein.

The cathode is prepared, for example, by applying a slurry containing the above-mentioned lithium-transition metal oxide, a conductive material and a binder on a current collector, followed by drying. Similarly, the anode is prepared by applying a slurry containing the above-mentioned carbon material, a conductive material and a binder on a thin current collector, followed by drying.

Further, the present disclosure provides a battery pack, comprising two or more unit cells, wherein each unit cell is the secondary battery.

Considering the efficiency of equipment and the structural stability, the battery pack of the present disclosure can be preferably used in electric vehicles (EVs), hybrid electric vehicles (HEVs), and plug-in hybrid electric vehicles (plug-in HEVs) which have limited equipment space and are often exposed to frequent vibration and strong impact.

What is claimed is:

1. A method for preparing a secondary battery comprising a jelly-roll type electrode assembly that includes a cathode, a separator and an anode, comprising:
    applying a reinforcing material over a segment to be formed as the width-direction end of the fore part of an electrode current collector and the width-direction end of the rear part of another electrode current collector in a continuous electrode current collector sheet; and
    cutting the continuous electrode current collector sheet at an interval of unit electrodes so that the reinforcing material is applied to the width-direction end of the fore part of one electrode current collector and to the width-direction end of the rear part of another electrode current collector.

2. The method of claim 1, wherein the reinforcing material is applied to both the longitudinal direction end of the electrode current collector.

3. The method of claim 1, wherein the reinforcing material is applied extending from the fore part of the electrode current collector to the starting part of the active material layer.

4. The method of claim 1, wherein the reinforcing material is applied on both surfaces of the fore part of the electrode current collector.

5. The method of claim 1, wherein the reinforcing material may have a thickness of 10 to 100 μm.

6. The method of claim 1, wherein the reinforcing material is thinner than the active material layer.

7. The method of claim 1, wherein the reinforcing material is made of any one selected from the group consisting of polytetrafluoroethylene (PTFE), tetrafluoroethylene-hexafluoropropylene copolymer (FEP), tetrafluoroethylene-ethylene copolymer (ETFE), tetrafluoroethylene-perfluoroalkylvinylether copolymer (PFA), polyvinylidene fluoride (PVDF), polybutylene terephthalate (PBT), polyethylene terephthalate (PET), polyethylene (PE), polyvinyl chloride (PVC), acetate resins, polyimide, glass cloth tapes, polyester, polyphenylene sulfide (PPS), polypropylene resins, steel use stainless, and a mixture thereof.

8. The method of claim 1, wherein the electrode current collector is made of aluminum.

9. The method of claim 1, further comprising winding the cathode, the separator, and the anode into the jelly-roll type electrode assembly.

10. The method of claim 9, further comprising sealing the jelly-roll type electrode assembly within a battery case.

* * * * *